July 14, 1925.
E. A. G. STREET
ELECTRIC CELL
Filed Aug. 9, 1921
1,545,801
Fig. 1.
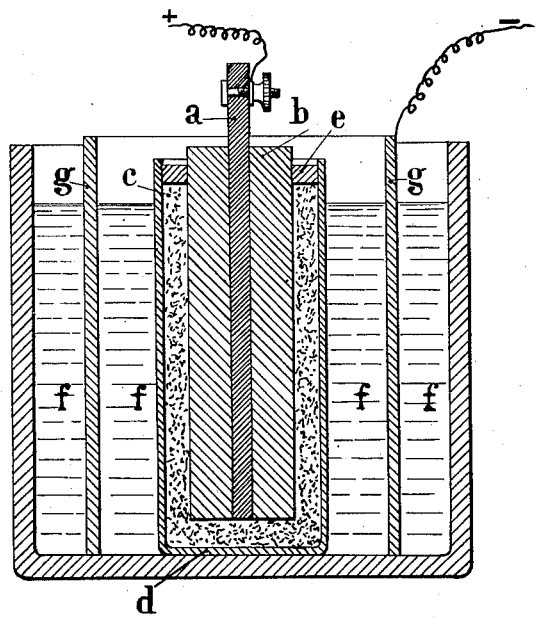
Fig. 2.
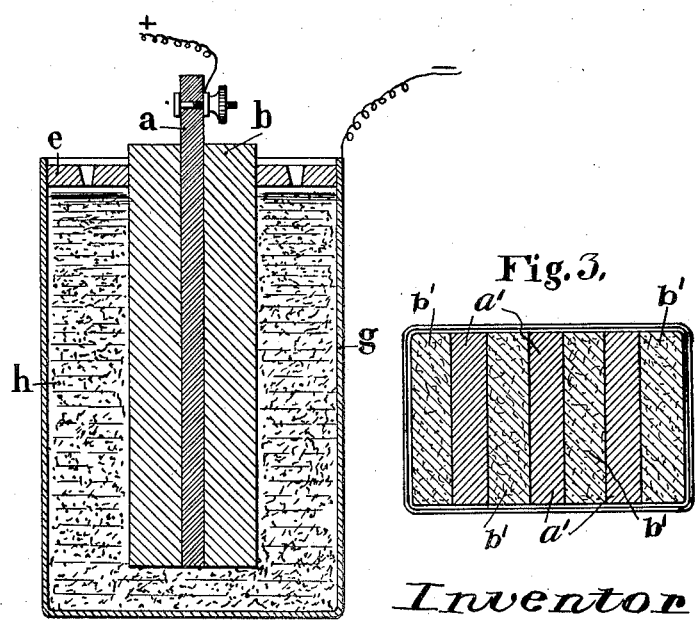
Fig. 3.
Inventor
E. A. G. Street,
By Marks & Clerk
Attys.

Patented July 14, 1925.

1,545,801

UNITED STATES PATENT OFFICE.

ERNEST AUGUSTE GEORGES STREET, OF LEVALLOIS-PERRET, FRANCE, ASSIGNOR TO SOCIÉTÉ ANONYME LE CARBONE, OF LEVALLOIS-PERRET, FRANCE.

ELECTRIC CELL.

Application filed August 9, 1921. Serial No. 490,966.

*To all whom it may concern:*

Be it known that I, ERNEST AUGUSTE GEORGES STREET, a citizen of the Republic of France, of 12 and 33 Rue de Lorraine, Levallois-Perret, Seine, France, have invented Improvements in and Relating to Electric Cells, of which the following is a full, clear, and exact description.

This invention relates to an electrolytic cell, which does not contain any depolarizing substance and in which the depolarizing is produced by the action of the surrounding atmosphere.

The invention relates to a special construction of the positive electrode which is designed in such a manner as to give simultaneously the following results:— a. electric conductivity.
b. porosity for gases,
c. an easy access for the depolarizing air or gases into the mass of the electrode.
d. the maintenance of the latter in a state of dryness, as complete as possible.

This invention is essentially characterized by the two following main points:—

1. The application of a conductive porous mass upon the positive electrode, the upper part of the said mass projecting above the electrolyte into the surrounding atmosphere. This porous mass consists, for instance, of charcoal and has for its effect to permit an active circulation of the gases which are due to the working of the cell and of those which are produced by the surrounding medium used as a depolarizer.

2. The protection of the said porous mass against the moisture of the electrolyte by a lining or sheath, having a degree of permeability such that the afflux of the electrolyte shall be sufficiently weak in order that the said electrolyte when coming into contact with the said porous mass shall be evaporated by the air or gas of the environing medium enclosed in the latter; under these conditions the porous mass surrounding the positive electrode is held in a state of dryness as complete as possible and maintains its power of absorption.

The present invention is applicable to cells having a liquid electrolyte and to cells having a fixed liquid.

Referring to the accompanying drawing wherein there is illustrated a cell having a liquid electrolyte, Figure 1 is a vertical section of the improved cell, and, Fig. 2 is a horizontal section of a modified form of positive electrode.

Figure 3 shows in horizontal section a modification of the invention.

In the mode of construction shown in Fig. 1, the positive electrode consists of a central carbon $a$ on which is mounted an agglomerate of charcoal $b$, the said charcoal being agglomerated under high pressure and burnt at a temperature which is sufficiently high for eliminating the hydro-carbons contained in the agglomerating substance and for imparting a sufficient porosity and a high electric conductivity to the product.

The said agglomerate of carbon may receive any suitable shape, such as cylindrical, parallelopipedic, winged, etc.

In order to avoid that this electrode, when immersed in the electrolyte, shall absorb too large a quantity of liquid which would make it lose its power of absorption of gases, the agglomerate of charcoal $b$ is protected by a coating or by a sheath $c$ constituted by a material slightly pervious to liquids, so as to permit the electrolyte to pass but slowly through it, in such a manner that the afflux of the electrolyte in the porous mass of charcoal $b$ should be sufficiently small in order that the said electrolyte when coming into contact with the said porous mass, shall be evaporated by the air or the gas of the surrounding medium enclosed in the latter. The said protective sheath consists, for instance, of a jelly similar to that used as a fixing substance in dry cells or of any other substance capable of fulfilling the same purpose.

The whole is contained in a casing or receptacle $d$, consisting for instance of a porous vessel or any other porous material capable of acting as a support for the sheath $c$ and of protecting it against shocks.

The upper part of the sheath $c$ is covered with a layer of protecting material $e$ such as colophony, wax, etc. The carbon $a$ and the porous mass project above the projecting material in such a manner as to be placed in direct contact with the air or gas of the environing medium used as a depolarizing substance.

The positive electrode constructed as just described is immersed into a liquid electrolyte $f$, such as a solution of ammonium chloride.

The negative electrode $g$ is made of zinc in the ordinary manner. In such a cell, the porous mass $b$ which is always maintained in a state of dryness as perfect as possible, allows a free circulation of the gas, consequently the hydrogen and the ammonia, which in the present case are formed during the working of the cell, are absorbed gradually by the porous mass $b$; under these conditions the depolarizing is produced in a continuous manner.

In the case when the invention is applied to a cell having a fixed liquid as shown in Fig. 2, the sheath $c$ and the casing $d$ are done away with; the positive electrode formed only of charcoal $a$ surrounded by a porous substance $b$ as described above, is immersed in the fixed electrolyte $h$ which is itself contained in the zinc receptacle $g$, forming the negative electrode and stopped at its upper part by a layer $e$ of colophony, wax, etc.

As previously stated, the carbon $a$ and the porous mass $b$ should project above the said receptacle in such a manner as to be in direct contact with the air or gas of the environing medium used as a depolarizing substance.

In the kind of cell according to the present invention, the charcoal forming the porous mass instead of being agglomerated could be simply pressed around the carbon $a$ and enclosed in a cloth sack, for instance; the charcoal will be mixed or not with more conductive substances such as plumbago.

With the object of effecting a complete distribution of the porous mass, and of obtaining a more rapid depolarization, the positive electrode can be formed of several ordinary charcoal blades $a'$ alternating with porous blades of charcoal $b'$, as shown in Fig. 3. The said ordinary blades of charcoal and the said porous blades being strongly pressed against each other by any other suitable means.

It is to be understood that the arrangement of a cell according to the present invention can be constructed in any form and of any size.

What I claim is:—

1. In an electric battery, a porous material of high absorbing capacity, such as a porous mass of wood charcoal, capable of energetically absorbing gases, such as atmospheric air which the gases produce during the course of reaction of the battery, said absorbent porous material being applied on the positive electrode and emerging into the atmosphere; a gelatinous material surrounds this porous absorbent material; a film formed by pectisation of the portion of this gelatinous material in contact with the porous absorbent material, this latter absorbing the uncombined water contained in said gelatinous material, said film being permeable to such degree that it absorbs only the quantity of electrolyte necessary for the production of the current and prevents the penetration of the electrolyte into the porous absorbent mass, while permitting the passage of the gases produced by the reaction of the battery.

2. An electric liquid cell comprising: a positive carbon electrode, a porous conducting agglomerate surrounding this positive electrode and emerging into the atmosphere, a sheath made of gelatinous material, surrounding this porous conducting agglomerate, a film formed by this gelatinous material in all its portion in contact with the porous conducting agglomerate, owing to the absorption by the latter of the small quantity of non-combined water it contains, the said film having such a degree of permeability that it simply absorbs the quantity of electrolyte necessary for the production of the current and prevents the penetration of the electrolyte into the mass of the porous conducting agglomerate, whilst permitting the passage of the gases produced by the reaction of the cell, a porous vessel containing the whole of the positive electrode, porous conducting agglomerate and its sheath of gelatinous material, a liquid electrolyte, for instance a solution of ammonium chloride, in which is immersed this porous vessel, a vessel containing this electrolyte, and an ordinary negative zinc electrode also immersed in the electrolyte.

3. An electric liquid cell comprising: a positive carbon electrode, a porous mass of charcoal surrounding this positive electrode and emerging into the atmosphere, a sheath made of gelatinous material, surrounding this porous mass of charcoal, a film formed by this gelatinous material in all its portion in contact with the porous mass of charcoal, owing to the absorption by the latter of the small quantity of non-combined water it contains, the said film having such a degree of permeability that it simply absorbs the quantity of electrolyte necessary for the production of the current and prevents the penetration of the electrolyte into the porous mass of charcoal, whilst permitting the passage of the gases produced by the reaction of the cell, a porous vessel containing the whole of the positive electrode, porous mass of charcoal and its sheath of gelatinous material, a liquid electrolyte, for instance a solution of ammonium chloride, in which is immersed this porous vessel, a vessel containing this electrolyte, and an ordinary negative zinc electrode also immersed in the electrolyte.

4. An electric cell comprising a positive electrode composed of several blades of ordinary carbon, blades constituted by a porous conducting agglomerate emerging into the atmosphere, interposed between the blades of ordinary carbon and applied on the outer faces of the end blades, means for firmly clamping these blades against each other, a gelatinous material surrounding the whole of the said blades, a film formed by this gelatinous material in all its portion in contact with the blades of porous conducting agglomerate, owing to the absorption by the latter of the small quantity of water it contains, the said film having such a degree of permeability that it simply absorbs the quantity of electrolyte necessary for the production of the current and prevents the penetration of the electrolyte into the mass of the blades formed of porous conducting agglomerate, whilst permitting the passage of the gases produced by the reaction of the cell.

5. An electric cell comprising a positive electrode composed of several blades of ordinary carbon, blades constituted by a porous mass of charcoal emerging into the atmosphere, interposed between the blades of ordinary carbon and applied on the outer faces of the end blades, means for firmly clamping these blades against each other, a gelatinous material surrounding the whole of the said blades, a film formed by this gelatinous material in all its portion in contact with the blades of porous charcoal, owing to the absorption by the latter of the small quantity of water it contains, the said film having such a degree of permeability that it simply absorbs the quantity of electrolyte necessary for the production of the current and prevents the penetration of the electrolyte into the mass of the blades formed of porous charcoal, whilst permitting the passage of the gases produced by the reaction of the cell.

The foregoing specification of my "improvements in and relating to electric cells" signed by me this 28th day of July, 1921.

ERNEST AUGUSTE GEORGES STREET.